(No Model.)
M. J. WIGHTMAN.
CONTROLLER FOR ELECTRIC MOTORS.
No. 423,975. Patented Mar. 25, 1890.
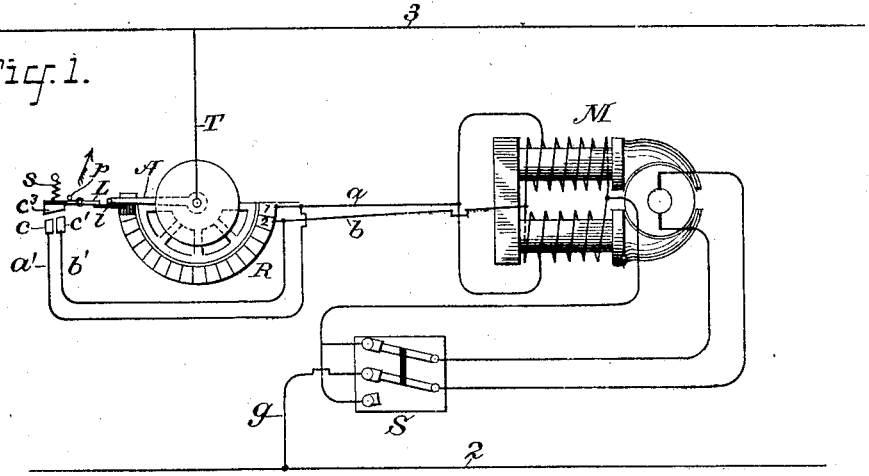
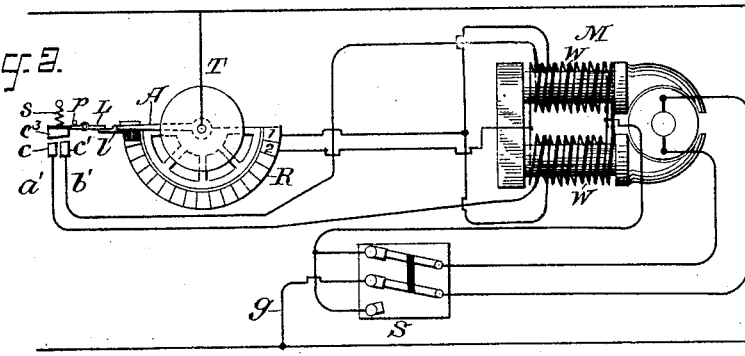
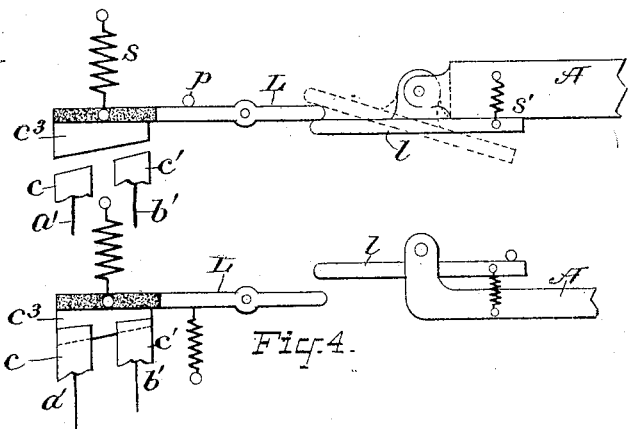
ATTEST:
INVENTOR:
Merle J. Wightman
By H. C. Townsend
Atty

UNITED STATES PATENT OFFICE.

MERLE J. WIGHTMAN, OF LYNN, MASSACHUSETTS, ASSIGNOR TO THE THOMSON-HOUSTON ELECTRIC COMPANY, OF CONNECTICUT.

CONTROLLER FOR ELECTRIC MOTORS.

SPECIFICATION forming part of Letters Patent No. 423,975, dated March 25, 1890.

Application filed September 24, 1889. Serial No. 324,966. (No model.)

*To all whom it may concern:*

Be it known that I, MERLE J. WIGHTMAN, a citizen of the United States, and a resident of Lynn, in the county of Essex and State of Massachusetts, have invented a certain new and useful Controller for Electric Motors, of which the following is a specification.

My invention is particularly designed for use in connection with railway-motors; but it is applicable to series-wound electric motors doing any kind of work.

In starting a series-wound electric motor there is required as much self-induction as possible, to prevent a great gush of current through it, because the armature is generating no counter electro-motive force, and, on the other hand, when the current through the motor is ruptured suddenly the energy of the field-magnets manifests itself by a very energetic flash at the point of a rupture. An extremely high potential is also generated in the field-magnet coils at this instant, and there is a probability that this may cause damage by puncturing the insulation. This "kick" of the field-magnets may be prevented from doing harm by providing a closed circuit band or conductor on the field-magnet in which, upon rupture of the circuit, a strong induced current will be produced that will act to retard or slow down the rate at which the field can lose its magnetism, and in so doing will prevent the sudden or violent rise of potential, which is apt to give trouble. The presence of this short circuit, however, when the current is first turned onto the motor, would, in the ordinary constructions, be detrimental, because it is desirable that the field-magnet should at this time oppose a strong counter electro-motive force or kick, and the effect of the short circuit is to give rise to conditions the same as would exist in the case of a transformer with its secondary short-circuited. The practical effect in the case of the motor is that, the armature being in a state of rest and generating no counter electro-motive force, an immense volume of current will suddenly traverse the motor when the current is turned on, and will cause damage to the insulation.

The object of my invention is to secure all the advantages of a short-circuited field-magnet conductor at the time of rupture of the connection or circuit through the motor, while at the same time overcoming the objections just stated to the use of such expedient.

My invention consists, essentially, in the combination, with the short-circuit conductor on the motor field-magnet, of suitable switch devices, whereby the circuit of said conductor may be opened or closed, so as to permit the operator to have such short circuit open or broken at the time that he turns the current onto the electric motor, and to have such short circuit closed at the time the circuit through the motor is broken. The switch that controls such short circuit may conveniently be a supplemental switch controlled by the main-circuit switch. It may be a biased switch—that is, may have a spring or weight normally tending to hold it in one of two positions, or may be adapted to retain either the open or closed position in which it may be placed by the operator. Ordinarily I prefer to use a biased switch, and I have hereinafter described my invention as carried out by the employment of a switch having such mechanical characteristic. It is obvious that the short-circuit switch may stand normally open or normally closed. If the former, it would be closed by the main switch just previous to rupture of the main circuit. If the latter, it would be arranged to be opened just at the time of closing the main circuit through the motor, the short circuit being maintained at other times.

My invention consists, further, in operating or controlling such circuit closing and opening devices by the switch that controls the connection of the motor with the source of energy.

My invention consists, also, in details of construction and organizations, to be hereinafter described and claimed, whereby the ends sought may be attained, and whereby the speed of the motor may be governed.

The invention may be carried out by any form of circuit closing and breaking device, such as employed for electric switches; and I have, for the sake of simplicity, confined the description to one of such forms well-known to electricians.

The short-circuit conductor on the field-magnet may be a part of the coils which are used in energizing the field when the motor is working at full load, or may be an entirely separate conductor or coil whose only office is to prevent damage when the current is thrown off. Any conductor or coil adapted to be the seat of a strong induced current generated by the fall of magnetism in the field-magnet will answer the purpose of my invention.

My invention is of especial utility in connection with electric-railway motors.

In the accompanying drawings, Figure 1 is a diagram of circuits and apparatus embodying my invention. Fig. 2 illustrates a modification. Fig. 3 shows a side elevation of a part of the switch mechanism in detail. Fig. 4 illustrates a modification in the arrangement of the switch that closes and breaks the circuit of the conductor, which is put on closed circuit for the purpose of absorbing the extra current.

Referring to Fig. 1, T and $g$ respectively indicate the terminals of the circuit of the motor and connected apparatus, while 2 3 indicate electric mains or conductors, which in the present instance are supposed to be of constant potential, from which the motor derives the current by which it is operated.

M indicates the electric motor, the field-magnet coils of which are here shown arranged in multiple arc, while S indicates an ordinary reversal-switch placed in $r$ connection between the motor-armature and field. The armature and field are placed in series with one another, as usual in the art.

A indicates the electric switch that controls the circuit through the motor. This switch is here shown as an ordinary switch-lever, which in addition to the function of breaking the circuit serves also to control the amount of resistance in the circuit for the purpose of varying the speed of the same.

R indicates the series of contact-plates of an artificial resistance or rheostat of any desired character, over which the contact-spring carried by the arm A may be moved. The terminal contact of the rheostat at which the resistance is least is indicated by the numeral 2, and is joined by the wire $b$ to the terminal of the field-magnet coil. The lever A is connected directly to the terminal T or the circuit 3, as indicated. A switch-contact (indicated by the numeral 1) is joined by wire $a$ to one terminal of a section of field-winding, so that after the switch has reached contact 2' and is moved still farther it will pass to contact 1, and will thereby cut out of circuit a section of the field-winding. The effect of this is to still further increase the speed of the motor by decreasing the field magnetism, and thereby lowering the counter electro-motive force, so that more current may flow through the motor. When the arm A is at the opposite extreme of the series of contacts of the rheostat, the resistance in the motor-circuit will be at its maximum and the speed will be lowered. The lever A, when moved in the direction of the arrow off the terminal contact, will break the circuit through the motor in the ordinary manner of any circuit-breaking switch controlling the circuit through the motor.

In Fig. 1 the section of coil of the field-magnet included between wires $a\ b$ is used as the short-circuited conductor on the field, which takes up the extra current ensuing on breaking the circuit. The short circuit for such section is completed by a circuit breaker and closer. $c\ c'$ are two contacts of such a device joined by wires $a'\ b'$ to wires $a\ b$, while $c^3$ is the circuit-closing plate that by making contact with both plates $c\ c'$ closes the short circuit. In the present instance the circuit-closer is held open normally by a spring $s$ against a stop $p$.

The lever L of the circuit closer and breaker is arranged to be engaged by a trip-lever $l$, pivoted on the arm A and provided with a spring $s'$, that normally holds it in the position shown in full lines in Fig. 3. These parts are so arranged with relation to one another that at the instant before the main switch opens the circuit the trip-lever $l$ will engage with the circuit-closing lever L, and will close the short circuit and keep the same closed until the main switch has moved sufficiently far to put out any arc that might follow on rupture of the circuit. After this point is passed the trip-lever $l$ may escape by the circuit-closing lever, so that on return of the lever A for the purpose of again closing the circuit the trip-lever $l$ may slip by the lever L, in the manner indicated by the dotted lines, Fig. 3.

The circuit through the motor is as follows: From conductor T through switch A, rheostat R, line $b$, fields of motor in multiple, reversing-switch S, armature of the motor back to reversing-switch S, and out at $g$.

The operation of the apparatus would be as follows: Normally the section of winding connected to $a\ b$ performs its ordinary function of energizing the field-magnet, its short circuit at the switch $c\ c'$ being open. If the main switch A be turned to open the circuit of the motor the section of field-winding will be short-circuited at the instant of rupture of the connection through the motor. The strong induced currents circulating in such winding will have the effect of retarding or cutting down the heavy extra current and preventing destructive sparking or evolution of dangerous potential in the field-windings. After this operation the circuit-closing device opens the short circuit for the section of field-coil and maintains the same open until a repetition of the operation just described. As the switch is turned back to close the circuit through the motor, the short-circuit closer for the section of field-winding maintains its open position, as just explained; hence the field-magnet coils may exercise freely the self-induction, which will prevent a sudden rush of current through the motor and consequent injury at the time of starting the motor. As the arm A is turned, the resistance is gradually decreased and the motor speed gradually increased, until, finally, the switch passes to the contact *l*, thereby cutting out a section of the field-winding and still further increasing the speed beyond the capacity of the rheostat to do so by diminution of rheostatic resistance.

In Fig. 2 the short-circuited coil or conductor is a separate conductor W on the field-magnet, which conductor is connected directly by wires *a' b'* to the circuit breaker and closer before explained. The effect of the induced current excited in this conductor at the time of breakage of circuit is, as before explained, to virtually absorb the extra current. As the circuit of this conductor is open at the time of closure of connection by the switch A, the objection to the use of this expedient is entirely removed.

In Fig. 2 I retain the device for cutting out or removing from circuit a section of the field-magnet after the capacity of the rheostat to increase the speed has been exhausted.

In Figs. 1 and 2 the circuit-closer or switch that controls the short-circuited winding is a biased switch, and is given a bias which tends to hold it normally open, so that under ordinary conditions of working the short circuit of the conductor, which eliminates the effects of extra current, is open. It is obvious, however, that this arrangement might be reversed and that said switch might be arranged so as to normally close the circuit, the switch-lever A in this instance operating to open such circuit at the instant or at the instant before it closes the circuit of the motor. This is illustrated in Fig. 4. The switch-lever A may pass freely by the circuit-closer when the switch is operated to open the circuit, thus permitting the circuit-closer to maintain its circuit-closing position. As the switch is moved, however, in the opposite direction to close the circuit through the motor, the trip-lever *l* engages with the circuit-closer and opens the same, so that the short-circuited conductor can have no effect in cutting down the reactive resistance of the field-magnet to the sudden rush of current.

I do not limit myself to any particular devices for opening and closing the electric circuits, as this is a detail of mechanism which may be indefinitely varied without departing from my invention. Nor do I limit myself to any particular means or mechanism for operating the circuit-closer by the main switch, since my invention consists, broadly, in the combination of these two devices arranged or combined as described, so that the main switch may operate the circuit-closing switch that closes or breaks the short circuit for a conductor or winding on the field-magnet.

While I have described the short-circuiting switch as operated by the main switch, it is obvious that it might be operated independently at the proper time for securing the effects already explained. The cutting out of a section of the field-magnet coil might likewise be effected by any arrangement of circuit-closers or switches proper for removing such coil-section from the circuit, so that the electric current may not flow through it. Many devices of this nature will readily occur to electricians.

What I claim as my invention is—

1. The combination, with the field-magnet for an electric motor, of a circuit closer and breaker in the circuit to such motor, a coil or conductor placed on such field-magnet and adapted to form the seat of a retarding induced current at the time of rupture of the circuit through the motor, and means for opening and closing the circuit of said conductor when the circuit to the motor is closed and open, as and for the purpose described.

2. The combination, with an electric motor provided with a circuit-breaking switch for cutting off the connection of said motor with an electric source, of an independent circuit breaker and closer in a short circuit for a coil or conductor on the field of said motor, whereby said short circuit may be closed at the instant the circuit-breaking switch is opened, and vice versa.

3. The combination, with an electric motor, of a circuit-breaking switch between the same and the source of energy and a short-circuiting switch governed by the first and connected to a coil on the field-magnet of the motor.

4. The combination, with the circuit-breaker and closer in the circuit to the motor, of a short circuit for coils on the field-magnet of the motor and a circuit-closer in such circuit operated by the first-named switch on a movement thereof in a direction to open the circuit of the motor.

5. The combination, with an electric motor, of a circuit breaker and closer in the connection between the same and a suitable source of energy, short-circuit connections for a coil or conductors on the field-magnet of the motor, and a supplemental switch to whose contacts such connections are carried, said supplemental switch being actuated by the first at the instant before the rupture of the circuit of the motor.

6. The combination, with an electric motor, of a rheostatic switch and a short-circuit switch governed by said rheostatic switch for closing a short circuit of a conductor on the field-magnet, as and for the purpose described.

7. The combination, with a series-wound electric motor, of a rheostatic speed-governing switch in the circuit thereof and suitable switch contacts and connections for cutting out a portion of the field-magnet coils when the rheostatic switch has thrown out the resistance.

8. The combination, with the rheostatic switch, of a contact located at the terminal of the rheostatic contacts and connected to the terminal of a section of the field-magnet